Figure 4:
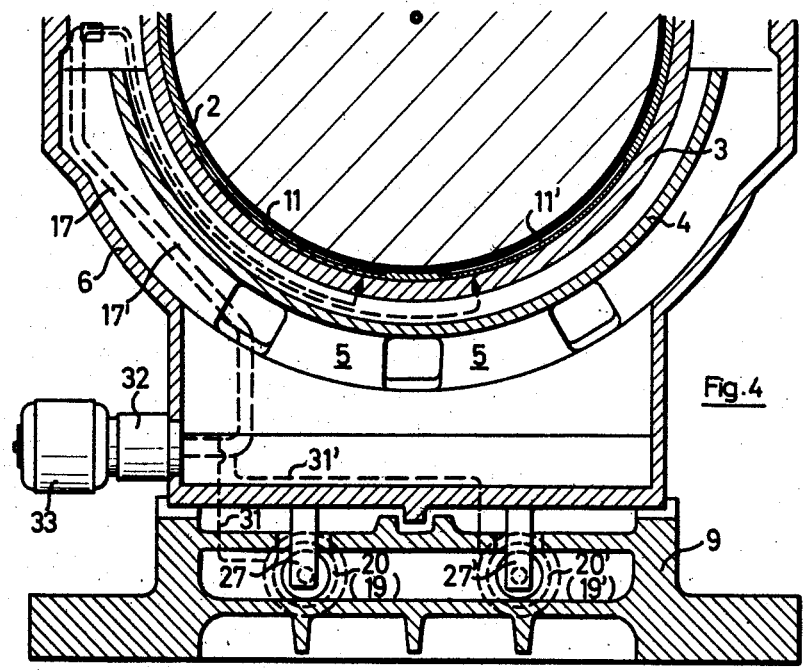

Nov. 3, 1964  R. RUEGG  3,155,438
HYDROSTATIC SHAFT MOUNTING
Filed Feb. 21, 1963  3 Sheets-Sheet 1
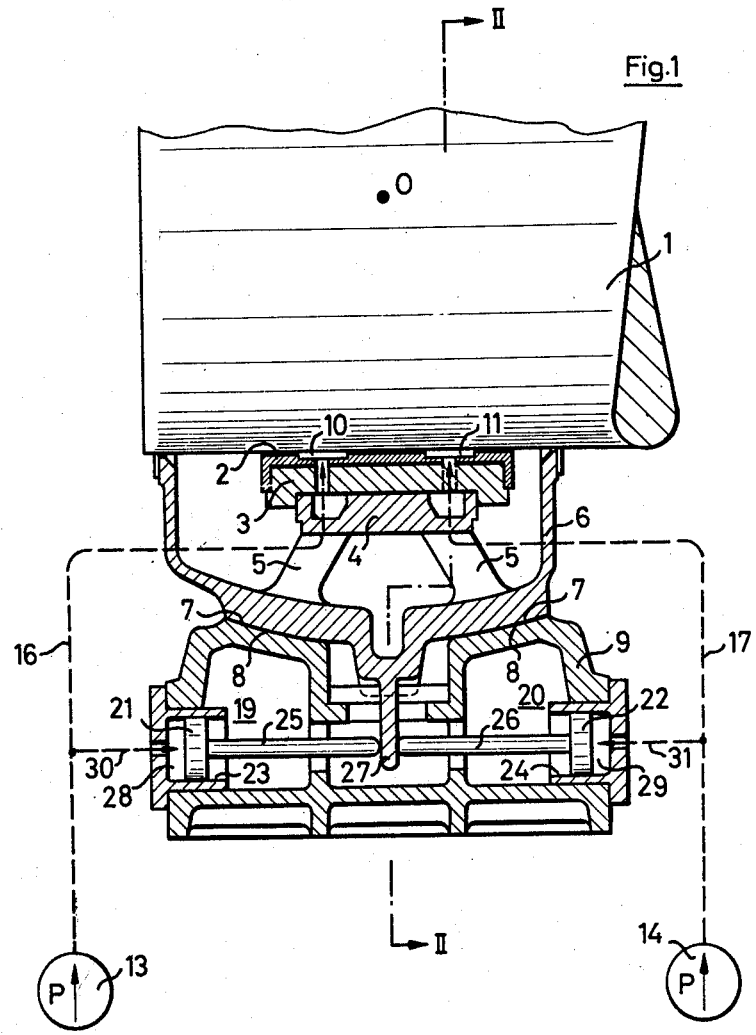
INVENTOR.
Rudolf Ruegg
BY
Dodge and Sons
Attorneys

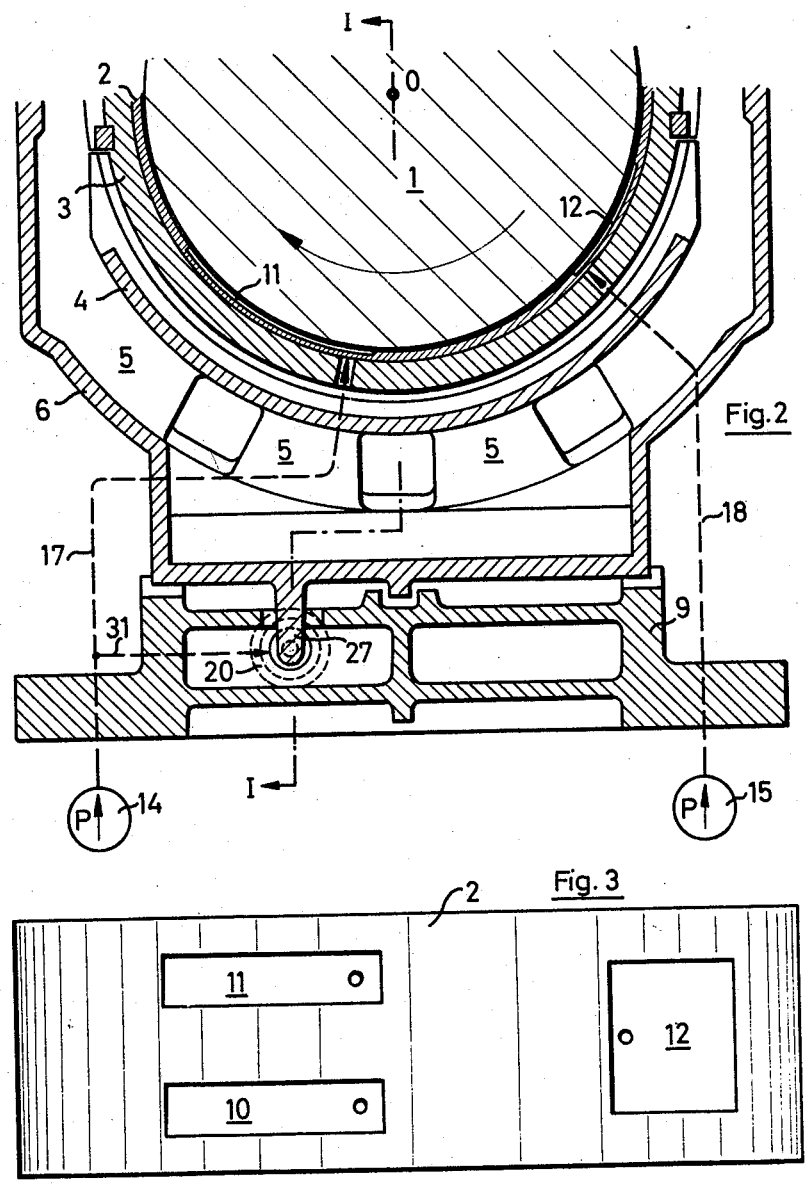

Nov. 3, 1964 R. RUEGG 3,155,438
HYDROSTATIC SHAFT MOUNTING
Filed Feb. 21, 1963 3 Sheets-Sheet 3

INVENTOR.
Rudolf Ruegg
BY
Dodge and Sons
Attorneys

United States Patent Office 3,155,438
Patented Nov. 3, 1964

3,155,438
HYDROSTATIC SHAFT MOUNTING
Rudolf Ruegg, Zurich, Switzerland, assignor to Escher Wyss Aktiengesellschaft, Zurich, Switzerland, a corporation of Switzerland
Filed Feb. 21, 1963, Ser. No. 260,180
Claims priority, application Switzerland, Mar. 9, 1962, 2,858/62
10 Claims. (Cl. 308—72)

This invention relates to a hydrostatic radial mounting of a shaft or journal, wherein individual pockets distributed in the bearing surface are provided, which pockets are supplied with lubricant under pressure by separate lubricant sources and form pressure pads for the shaft or journal.

In the hitherto known mountings of this kind, the pressure pockets are uniformly distributed on the periphery of the bearing. In such a case, at least three pockets are required for centering the shaft. If conformity is also to be obtained in the axial direction of the bearing and shaft, that is to say, if tilting of the shaft in the bearing is to be prevented, a second such group of pockets is necessary, so that altogether six pressure pockets are to be provided.

If, however, it is a matter of mounting large and heavy rotary members having horizontal or inclined axis of rotation, such bearings become relatively costly.

It is an object of this invention to obviate this drawback. For this purpose at least three pressure pockets are provided only on the underside of the shaft or journal in the bearing surface, and at least two thereof are offset relative to each other in the axial direction.

In this way, with comparatively small expenditure, a satisfactory mounting is obtained, which is more particularly suitable for comparatively heavy members with large-diameter shafts or journals, rotating at a comparatively low speed, so that support from above is not necessary.

In this sense, the invention furthermore relates to the use of this mounting for a tube mill of the cement or lime industry.

Heretofore, in these tube mills, self-lubricating bearings have generally been used. In view of the large dimensions of the mills currently employed, however, the mounting according to the invention affords considerable advantages, since at a relatively low cost, it enables pure fluid friction to be obtained and thus to keep down the driving power necessary for covering the bearing losses.

A further object of this invention is to provide a bearing which automatically adjusts itself to the direction of the journal or shaft axis even when loaded by heavy rotary members.

Figure 5:
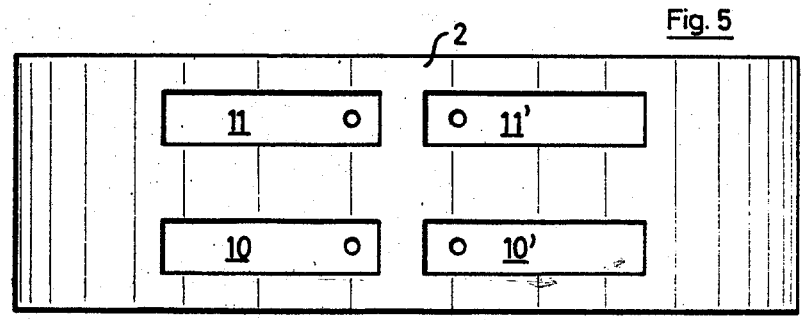

Still further objects and advantages of this invention will be readily apparent by reference to the following description of constructional examples of the subject of the invention which are represented in simplified form in the accompanying drawing, wherein:

FIG. 1 shows an axial longitudinal section through a first constructional example of the mounting of a tube-mill shaft the section being taken on the line I—I of FIG. 2, FIG. 2 is a section on the line II—II of FIG. 1, FIG. 3 is the development of the bearing surface of the constructional examples according to FIGS. 1 and 2, FIG. 4 shows a section through another constructional example transversely of the axis, and FIG. 5 is the development of the bearing surface of the constructional example according to FIG. 4.

According to FIGS. 1 and 2, a journal 1 of the rotary member of a tube mill not shown is mounted with horizontal axis in the liner 2 of a bearing bush 3. The bearing bush 3 is inserted in an annular segment 4 connected by struts 5 to a housing 6 surrounding the whole. The housing 6 rests with a spherical surface 7 on a correspondingly shaped countersurface 8 of a fixed bearing bracket 9 such that it can adjust itself freely about the centre 0.

The bearing surface of the liner 2 serving for the radial mounting of the journal 1 is provided with three pressure fluid containing pockets 10, 11, 12, which open toward the journal 1 and are supplied with lubricant under pressure by individual pressure lubricant supply means, namely by pumps 13, 14 and 15 of the displacement type, for example gearwheel pumps, via pipes 16, 17, and 18, respectively, and which form pressure pads for the journal 1. This is a hydrostatic radial mounting of the journal 1.

Each of the pumps 13, 14, 15 delivers a definite amount of lubricant in unit time. There is thus built up in each of the pockets 10, 11, 12 a pressure such that the journal 1 is lifted off the bearing surface, and permits the quantity of lubricant supplied by the respective pump to escape through the bearing clearance thus formed into the interior of the housing 6, whence the lubricant returns to the pump through pipes not shown. The journal 1 floats on the pressure pads formed by the pockets 10, 11, 12 so that only small frictional resistances are to be overcome on rotation of the journal about its axis.

For mounting the journal 1, the said three pressure pockets 10, 11, 12 are provided solely on its underside. No pockets are provided on the upper side of the journal 1. The journal is therefore supported in the bearing substantially at three points.

As follows from FIGS. 1 and 3, two of the pressure fluid containing pockets, namely the pockets 10 and 11, are disposed offset relative to each other in the axial direction and in axial alignment. This is to prevent the journal 1 from coming into metallic contact with the liner 2 on becoming inclined in the bearing, a higher pressure being built up in the pocket at which the journal approaches the bearing than in the other pocket.

A further improvement results, however, from the aforesaid adjustability of the housing 6 about the centre 0, this being achieved by the fact that the housing 6 is adapted to slide with the spherical surfaces 7 on the countersurface 8 of the bearing bracket 9. The bush 3 is therefore adjustable in its inclination both vertically and also laterally.

As special means for overcoming the friction on the sliding surfaces 7, there is provided for varying the inclination of the bearing bush 3 in the bearing bracket 9 an adjusting device, having two servomotors 19, 20 with pistons 21 and 22, respectively, reciprocable in cylinders 23 and 24, respectively. The two servomotors 19, 20 are arranged axially on either side of the centre plane of the bearing. The pistons 21, 22 are provided with rods 25 and 26, respectively, extending parallel to the axis of the journal 1 and bearing by their ends against a downwardly extending projection 27 of the bearing housing 6.

The cylinder spaces 28 and 29, situated on the opposite side of the rods 25 and 26 with respect to the pistons 21 and 22, are connected by pipes 30 and 31 to the lubricant supply pipes 16 and 17 leading to the respective pressure pockets 10 and 11.

The described adjusting device functions as follows:

If, for example, due to a deformation of the tube mill rotary member, the journal 1 sets itself obliquely with respect to the bearing such that the clearance in the region of the pressure pocket 10 becomes larger, while that on the region of the pressure pocket 11 becomes smaller, the pressure in the pipe 16 falls and the pressure in pipe 17 rises. The force exerted by the piston 21 by means of the rod 25 on the projection 27 of the bearing housing 6 is thus reduced, and the force exerted by the piston 28 in the opposite direction on said extension 27 by means of rod 26 is increased. The housing 6 will thus be rotated in the clockwise direction (as viewed in FIG. 1), until the inclination of the bearing bush 3 has adapted itself to the altered inclination of the journal 1, which is the case when the fluid pressures in the two pockets 10 and 11 are in the same ratio to each other as before. More pratically, equality of the two pressures will be obtained if, as shown, the pistons 21 and 22 have the same cross-section. The adjusting device provided with the servomotors 19 and 20 is thus under the influence of the pressures prevailing in the axially offset pressure pockets 10 and 11, and adjusts the bearing housing 6 for maintaining a predetermined ratio of said pressures.

In the constructional example described, the adjusting device is more particularly under the influence of the difference between these two pressures.

Without departing from the principle of the invention, the adjusting device, of course, may be otherwise constructed with the same effect. Thus, for example, instead of pistons 21, 22 sliding in the cylinders 23, 24 of the servomotors 19, 20, it is also possible to use diaphragm bellows. Furthermore, the two single-acting servomotors 19 and 20 can be replaced by one double-acting motor whose opposed working chambers are connected with the pipes 16 and 17, respectively.

The provision of an adjusting device of the kind described under the influence of the pressures prevailing in the axially offset pressure pockets for varying the inclination of the bearing bush is particularly favourable when bearings of large diameter and relatively short length are used, as is the case in tube mills, because the journals are generally hollow and serve for the supply or discharge of the ground material. The moments exerted by the reactions of the pressure pads of the pockets 10, 11 themselves on the bearing bush 3, which per se could act already for adapting the inclination of the bearing bush 3 to the inclination of the journal 1, are then comparatively small, so that in certain cases they would be quite unable to overcome the frictional resistances on the sliding surfaces between the bearing housing 6 and the bearing bracket 9, before metallic contact occurred between the journal 1 and the liner 2.

The third pressure pocket 12 is arranged axially substantially in the middle between the two pockets 10 and 11, but offset peripherally relative to them. It makes no contribution to the adjustment of the inclination of the bearing bush, but with the other two pressure pockets, serves for centering the journal in the bearing.

Since the bearing should not be exposed to any damage also in the case of failure of the supply of lubricant under pressure, it will be advisable to provide, in addition to the lubricant sources for the pressure pockets, self-lubrication ensuring emergency running of the bearing in the case of failure of the lubricant supplied under pressure. Ring lubrication of known type may be used for example for this purpose.

In order that with such lubrication, the lubricant wedge can be correctly formed, lands are provided in the bearing surface around and between the pressure pockets 10, 11, 12 in the bearing described, as will be gathered from FIGS. 2 and 3. With the direction of rotation provided for the journal 1 as indicated by the arrow in FIG. 2, the two axially offset pockets 10 and 11 are arranged on the exit side near the lowest point of the bearing surface, and the third pressure pocket 12 is situated laterally on the entry side of the bearing.

Instead of only three pressure pockets, four or more pressure pockets may be provided in the bearing surface on the underside of the journal. A construction of the bearing with four pockets is shown in FIGS. 4 and 5.

Corresponding parts are here provided with the same reference numerals as in FIGS. 1 to 3. In addition to the pair of axially aligned pockets 10 and 11, however, and instead of pocket 12, a further pair of two axially aligned pockets 10' and 11' is provided in the liner 2 for the formation of pressure pads. The pockets 10' and 11' are circumferentially spaced from the pockets 10 and 11, respectively, and in circumferential alignment therewith.

Each of the pockets 10, 11, 10', 11' is provided with lubricant under pressure by a separate pump. These pumps are combined in a housing 32 to form a unit driven by an electric motor 33 and flanged directly on to the bearing housing 6, which forms a chamber for collecting the lubricant escaping from the bearing. The pumps communicate with this collecting chamber and convey the lubricant through pipes 17 and 17' mounted in the housing 6 to the pressure pockets 11, 11'. Other pipes 31, 31' establish connection between the pipes 17 and 17' and the cylinder spaces of the servomotors 20 and 20'. Of course, this arrangement of the pumps may also be provided in the case of the bearing shown in FIGS. 1 to 3.

In addition to the servomotors 19, 20 connected to the pressure pockets 10, 11 and acting on the projection 27 of the bearing housing 6, there are provided in the bearing according to FIGS. 4 and 5 two further servomotors 19', 20', connected to the pressure pockets 10', 11' and acting on a projection 27' of the bearing housing 6. The mode of operation of the two servomotors 19', 20' is the same as that described with reference to FIGS. 1 to 3 for the servomotors 19, 20. In order to eliminate entirely any movable connecting pipes the servomotors may also be arranged in the pivotable bearing housing instead of in the stationary bearing bracket.

What is claimed is:

1. In combination a fixed bearing member; a pivotable bearing member having a bearing surface; a journal mounted for rotation about its axis in said pivotable bearing member; said pivotable bearing member being mounted in said fixed bearing member so as to allow angular displacement; said bearing surface of the pivotable bearing member being provided with at least two pressure fluid containing pockets opening toward said journal and disposed offset relative to each other in the axial direction of the journal; individual pressure lubricant supply means for each of said pockets; and servomotor means sensitive to the fluid pressures prevailing in said axially offset pockets and operatively connected with said pivotable and fixed bearing members so as to adjust the angular position of the pivotable bearing member until a predetermined ratio of the pressures prevailing in said axially offset pockets is obtained.

2. The combination defined in claim 1 in which the servomotor means comprise fluid pressure actuated members for the angular displacement of the pivotable bearing member in relation to the fixed bearing member; and flow connections for subjecting said fluid pressure actuated members to the fluid pressure prevailing in said axially offset pockets.

3. The combination defined in claim 2 in which the fluid pressure actuated members are dimensioned so as to be actuated by the difference of the pressures prevailing in the axially offset pockets.

4. The combination defined in claim 1 in which the journal is mounted with at least approximately horizontal axis and the pockets are arranged in that part of the bearing surface of the pivotable bearing member which extends along the lower part of the periphery of the journal.

5. The combination defined in claim 4 in which the bearing surface is provided with three pressure fluid containing pockets, the axially offset pockets and the third pocket being arranged on opposite sides with respect to the lowermost point of the bearing surface.

6. The combination defined in claim 4 in which the bearing surface is provided with two pairs of axially offset pockets arranged on opposite sides with respect to the lowermost point of the bearing surface; and in which two servomotor devices are provided for the angular displacement of the pivotable bearing member, one being sensitive to the fluid pressures prevailing in the pockets of one of said pairs and the other being sensitive to the fluid pressures prevailing in the pockets of the other pair.

7. The combination defined in claim 1 in which the pivotable bearing member is formed with a chamber for collecting the lubricant escaping from the bearing, and in which the pressure fluid supply means comprise pumps fixed to the pivotable bearing member so as to communicate with said collecting chamber.

8. The combination defined in claim 7 in which the pumps are combined to a common unit.

9. The combination defined in claim 1 in which the journal is a component of the rotor of a tube mill.

10. In combination a fixed bearing member; a pivotable bearing member having a bearing surface; a journal mounted for rotation about its axis in said pivotable bearing member; said pivotable bearing member being mounted in said fixed bearing member so as to allow angular displacement; said bearing surface of the pivotable bearing member being provided with at least two pressure fluid containing pockets opening toward said journal and disposed offset relative to each other in the axial direction of the journal; and individual pressure lubricant supply means for each of said pockets; said pivotable bearing being formed with a chamber for collecting the lubricant escaping from the bearing, and the pressure lubricant supply means comprising motor driven pumps fixed to the pivotable bearing member so as to communicate with said collecting chamber and to deliver the collected lubricant to said pockets.

References Cited by the Examiner

UNITED STATES PATENTS

| | | | |
|---|---|---|---|
| 2,578,711 | 12/51 | Martellotti | 308—122 |
| 2,671,700 | 3/54 | Seyffert. | |
| 3,016,273 | 1/62 | Benoit | 308—9 |
| 3,039,830 | 6/62 | Whitley. | |
| 3,076,524 | 2/63 | Avallone | 308—122 |

FOREIGN PATENTS 186,595   5/23   Great Britain.

FRANK SUSKO, *Primary Examiner.*